US010266303B1

(12) United States Patent
Kownacki et al.

(10) Patent No.: US 10,266,303 B1
(45) Date of Patent: Apr. 23, 2019

(54) LIGHT-WEIGHT STRUCTURAL PANEL CONSTRUCTION

(71) Applicants: Charles D. Kownacki, Erie, PA (US); Steven Mansfield, Beaver Falls, PA (US)

(72) Inventors: Charles D. Kownacki, Erie, PA (US); Steven Mansfield, Beaver Falls, PA (US)

( * ) Notice: Subject to any disclaimer, the term of this patent is extended or adjusted under 35 U.S.C. 154(b) by 143 days.

(21) Appl. No.: 15/257,227

(22) Filed: Sep. 6, 2016

(51) Int. Cl.
*B32B 5/02* (2006.01)
*B32B 5/18* (2006.01)
*B32B 37/14* (2006.01)
*B65D 19/18* (2006.01)
*E04C 2/22* (2006.01)
*E04C 2/20* (2006.01)

(52) U.S. Cl.
CPC .............. *B65D 19/18* (2013.01); *B32B 5/024* (2013.01); *B32B 5/18* (2013.01); *B32B 37/14* (2013.01); *E04C 2/205* (2013.01); *E04C 2/22* (2013.01); *B32B 2250/40* (2013.01); *B32B 2262/101* (2013.01); *B32B 2315/085* (2013.01); *B32B 2607/00* (2013.01); *B65D 2519/00014* (2013.01); *B65D 2519/00049* (2013.01); *B65D 2519/00104* (2013.01); *B65D 2519/00368* (2013.01)

(58) Field of Classification Search
USPC ............................................ 428/304.4–319.9
See application file for complete search history.

(56) References Cited

U.S. PATENT DOCUMENTS 5,869,165 A * 2/1999 Rorabaugh ............ B29C 70/24
428/105

* cited by examiner

*Primary Examiner* — Scott R. Walshon
*Assistant Examiner* — Elaine M Vazquez
(74) *Attorney, Agent, or Firm* — Richard K. Thomson

(57) ABSTRACT

A light-weight structural panel is formed by pultruding a closed-cell foam core embedded with high-strength reinforcing pins through a pair of heated platens along with upper and lower sheets of woven fiber glass wetted by a polymer resin. The lengths of the reinforcing pins exceeds the thickness of the core so the platens compress the skin sheets forming pockets which accumulate excess resin that, when it cures, forms a more stable panel.

4 Claims, 4 Drawing Sheets

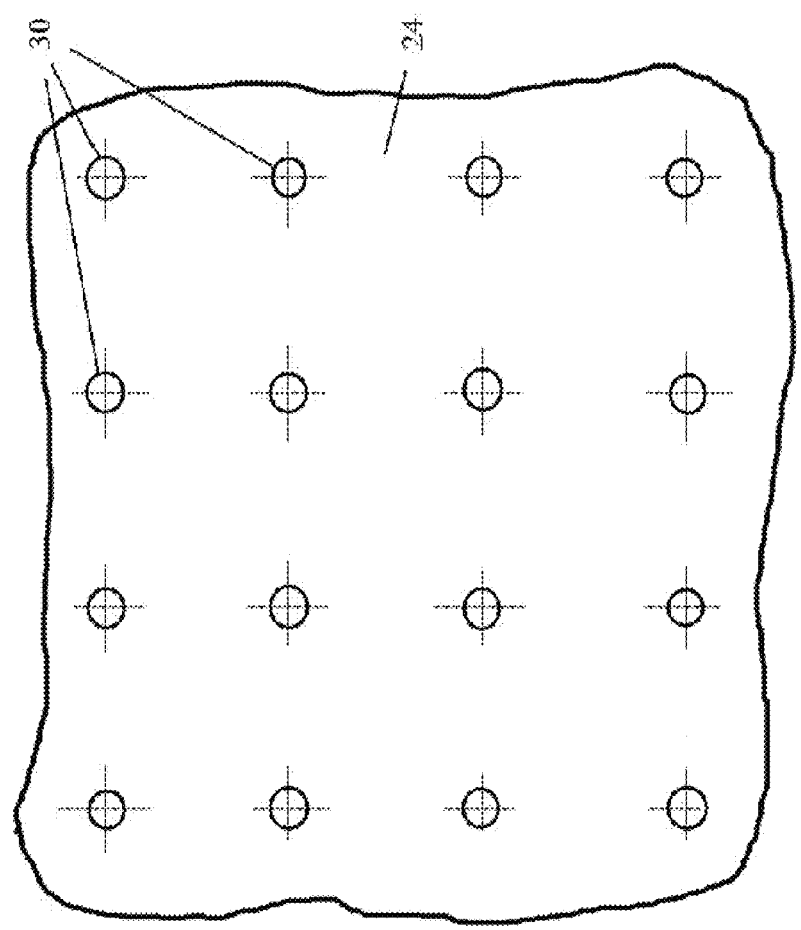

LIGHT-WEIGHT STRUCTURAL PANEL CONSTRUCTION

This application claims benefit of provisional patent appl. Ser. No. 62/214,861 filed Sep. 4, 2015, which is hereby incorporated by reference in its entirety.

BACKGROUND AND SUMMARY OF THE INVENTION

This invention is directed to the field of structural panels. More particularly, this invention is directed to the construction of a light-weight structural panel which can be formed in continuous long lengths making it less expensive to manufacture. This light-weight structural panel is usable as an aircraft cargo pallet, capable of meeting the specific requirements of the US Air Force set forth in MIL-DTL 27443F, hereby incorporated by reference. Subparagraph 4.5.9 c) requires "Using a 1 inch square steel mandrel, apply a 900-pound load to the top surface of one test panel. At the option of the supplier, the corners of the mandrel may be slightly rounded. The test panel may be from either test pallet number 1 or 2. The test specimen shall withstand the 900-pound load. Permanent deformation of the test panel in the load area shall not exceed 0.005 inch in depth. Deflection while under load shall not exceed 0.015 inch."

Pallet number 1 enumerated in the spec has dimensions of 88"×104"×2.25", while pallet number 2 is 88"×54"×2.25". Prior to the development of the present invention, no light-weight structural panel has been able to comply with this requirement. Existing compliant panels are made of heavier materials that are susceptible to moisture absorption, making them heavier yet. As the pallet weight increases, the fuel cost associated with transporting the pallet also increases. The present pallet saves 50 lbs over existing pallets and, as mentioned, the closed-cell structure is water-resistant.

The structural panel of the present invention has sandwich construction: a properly sized core of 2" thickness made of a closed-cell thermoset foam having lower and upper skin layers made of woven fiberglass wetted out by a polyurethane resin. A series of reinforcing pins in rows and columns extending throughout the dimensions of the panel, are spaced apart by 1" both laterally and axially. The pins are made of pultruded glass wetted out by a thermoset polymer resin, for example, a urethane resin. A key feature of the panel is that the lengths of the reinforcing pins exceed the 2" thickness of the core and compress both the lower and upper skin layers by 30-50% of the nominal thickness of each skin layer. Accordingly, the pins form pockets in the skin layers which accumulate excess resin effectively reinforcing these contact points. Desired sizes of the panel are cut into appropriately sized pallets. Excess material is removed from the periphery of the pallet and rails are adhesively secured in place.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
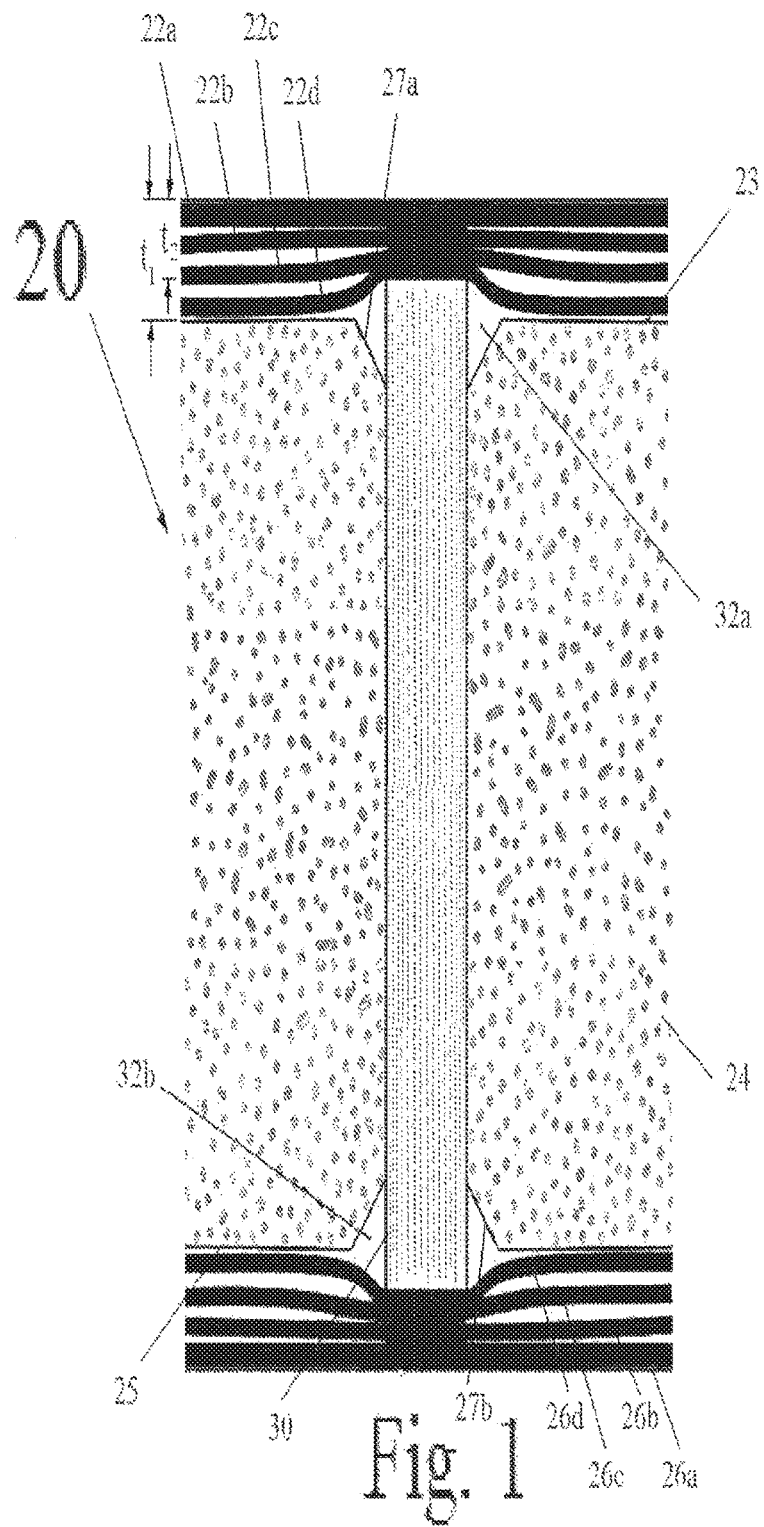
FIG. 1 is a schematic side view of the light-weight structural panel of the present invention.
Figure 2:
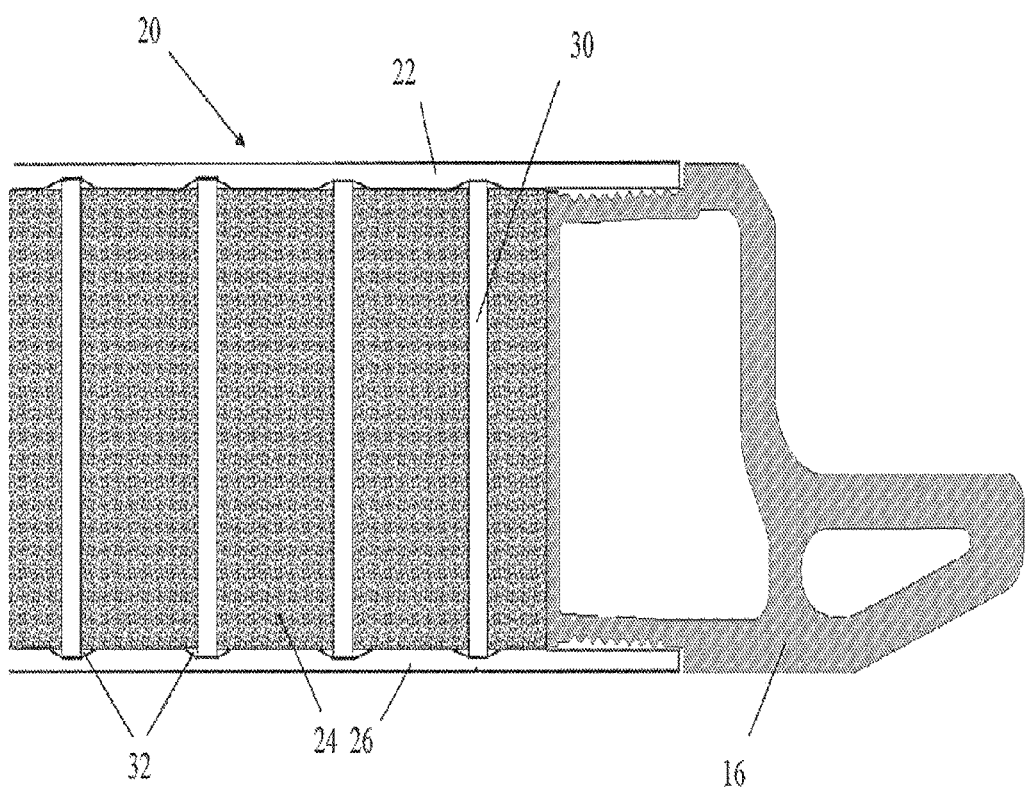
FIG. 2 is a schematic side view of the light-weight structural panel of FIG. 1 configured as a pallet.
Figure 3:
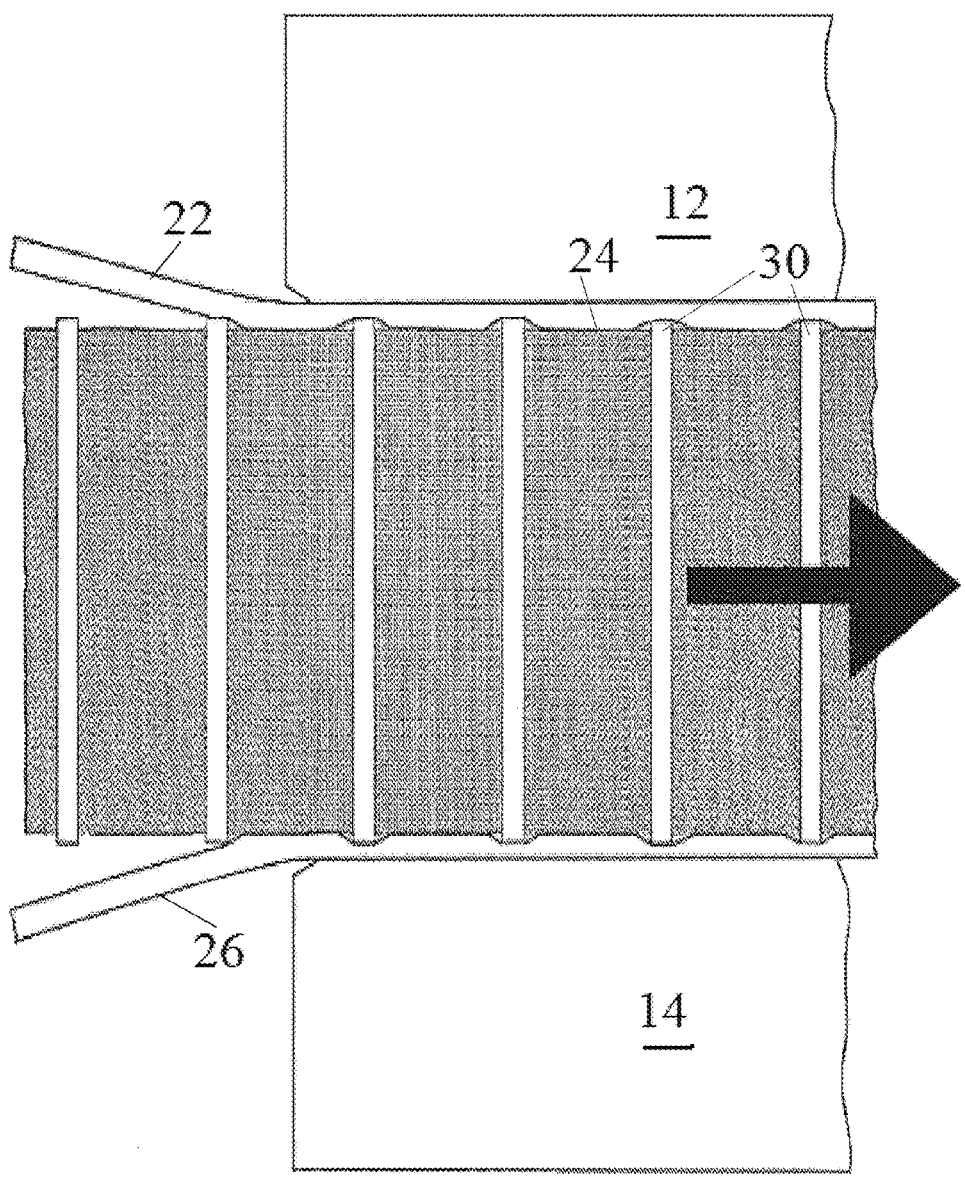
FIG. 3 is schematic depiction of a continuous manufacturing process for the light-weight structural panel of the present invention; and, FIG. 4 top schematic depicting the array of the reinforcing pins in the panel.

A first embodiment of the light-weight structural panel of the present invention is depicted in FIGS. 1-3 generally at 20. Panel 20 is comprised of a closed-cell foam core 24 having a first upper surface 23 and a second lower surface 25, a first multi-ply woven fiber glass sheet 22 made up of plies 22a, 22b, 22c, 22d that are wetted out by a thermoset polymer resin, possibly a polyurethane resin, and is bonded to first upper surface. Similarly, a second multi-ply woven fiber glass sheet 26 made up of plies 26a, 26b, 26c, 26d that are wetted out by the same thermoset polymer resin and is bonded to the second lower surface 25.

An array of reinforcing pins made of pultruded, oriented glass fibers 30 are equally spaced in rows and columns as depicted in FIG. 4. For the specific application of the pallet 20, the preferred spacing is one inch in each of the axial and lateral directions. Other spacing may be required for other applications.

Closed-cell foam core 24 has a nominal first thickness of 2.0 inches while the design thickness of the pallet 20 is 2.25". The length of each reinforcing column or pin 30 exceeds 2.0" in order to intentionally compress the plies of the upper and lower glass sheets 22, 26 respectively. Each pin 30 has a nominal diameter of 0.156 inches and a length of 2.075 inches. This length will compress fiber glass sheets 22, 26 by 30-50% from its generally uniform thickness '$t_1$' to thickness '$t_2$' (FIG. 1). In addition, a chamfered recess 27a, 27b is formed around each pin 30. [Note, the material from closed-cell foam core 24 may be removed from surfaces 23, 25 before pins 30 are inserted.] As shown in FIG. 1, the compression of sheets 22, 26, along with the chamfers 27a, 27b forms pockets 32a and 32b into which uncured polymer resin collects. When the resin is cured, columns are formed around ends of pins 30 strengthening the overall construction of pallet 20. Pultruded fiber glass pins 30 are glass saturated by resin, the resulting pins having 80% by weight, or greater, glass fibers and have a flexural modulus greater than 7.0 msi, compressive strength greater than 100 ksi, compressive modulus greater than 5.75 msi, and a strain at failure of greater than 1%.

The method of manufacturing pallet/panel 20 is schematically depicted in FIG. 3. A closed-cell foam core 24 is prepared by distributing reinforcing pins 30 in accordance with the array depicted in FIG. 4. The continuous manufacturing method of the present invention allows formation of a blank which is up to 300 feet long and can be cut to size. Core 24 is pultruded through a pair of heated platens 12 and 14 which compress upper sheet 22 and lower sheet 26 onto the upper (23) and lower (25) surfaces of core 24. The two sheets 22, 26 are drawn through polymer resin baths. As the platens squeeze sheets 22, 26 into place, pins 30 which are longer than the thickness of core 24, compress sheets 22, 26 and excess resin fills the pockets 32. When heated platens cure the resin in sheets 22, 26 and pockets 32, Once the panel has been properly sized, the material is removed from the side to provide a hollowed out space to receive rail 16 which is adhesively secured to the periphery of the pallet 20.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

We claim:

1. A light-weight structural panel capable of supporting a compressive load of 900 lb per square inch without experiencing as much as 0.015 inches deflection, said structural panel comprising:
    a) a central closed-cell foam core having an upper surface and a lower surface and a first uniform thickness defining a first length;
    b) a first upper skin covering at least a portion of said upper surface of said foam layer;
    c) a second lower skin covering at least a portion of said lower surface of said foam layer;
    d) an array of reinforcing pins positioned in said foam layer, each pin of said array having a compressive strength and distribution spacing adequate to support the 900 lb weight without permitting deflection exceeding 0.015 inch, each pin further having a second length exceeding said first length, and a first end substantially compressing said first upper skin covering without penetrating said first upper skin covering and a second end substantially compressing said second lower skin covering without penetrating said second lower skin covering.

2. The light-weight structural panel of claim 1 wherein said first upper skin covering and said second lower skin covering each have a second generally uniform thickness, said length of each of said pins being selected to cause first and second ends of said pins to compress said second generally uniform thickness of respectively said upper and lower skin coverings by between 25 and 75% of said second uniform thickness.

3. The light-weight structural panel of claim 2 wherein recesses are formed around each of said first and second ends of said pins and, along with the compression of said first upper and second lower skin coverings, said first and second ends of said pins form pockets in said upper and said lower skin coverings, said pockets receiving pools of resin therein which, when cured, increase stability of said structural panel.

4. A continuous method of forming said light-weight structural panel of claim 1, said method including the steps of
    a) forming said central closed-cell foam core with a first uniform thickness with reinforcing pins positioned at common spacing throughout a length and width of said core, said reinforcing pins each having a length which exceeds said first uniform thickness;
    b) positioning a first set of rolls of woven glass fiber sheets above a portion of said core, said woven glass fiber sheets on said first set of rolls forming a second uniform thickness;
    c) positioning a second set of rolls of woven glass fibers sheet below a portion of said core, said woven glass fiber sheets on said second set of rolls forming a second identical uniform thickness to that of said first set of rolls;
    d) pulling a length of said woven glass fiber sheets from said first set of rolls through a first wetting bath of polymer resin and into contact with an upper surface of said core;
    e) pulling a length of said woven glass fiber sheets from said second set of rolls through a second wetting bath of polymer resin and into contact with a lower surface of said core;
    f) forming a sandwich panel of said closed-cell foam core and said first and second woven glass fiber sheets by pultruding said core and said upper and lower sheets through a pair of heated platens, said platens being spaced by a distance which is less than an aggregate thickness of said first; and two second uniform thicknesses;
    whereby said reinforcing pins compress said two second uniform thicknesses of said woven glass fiber sheets forming pockets into which resin pools, said platens curing said resin in said upper and lower glass fiber sheets and in said pockets strengthening said resulting structural panel.

* * * * *